(12) United States Patent
Meis et al.

(10) Patent No.: US 8,650,944 B2
(45) Date of Patent: Feb. 18, 2014

(54) SUPERCOOLED LARGE DROP ICING CONDITION SIMULATION SYSTEM

(75) Inventors: Charles Steven Meis, Renton, WA (US); David Charles Hass, Renton, WA (US); Carl Hallstrom, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 30 days.

(21) Appl. No.: 13/419,033

(22) Filed: Mar. 13, 2012

(65) Prior Publication Data

US 2013/0239670 A1 Sep. 19, 2013

(51) Int. Cl.
*G01M 9/02* (2006.01)

(52) U.S. Cl.
USPC ........................................ 73/118.03; 73/147

(58) Field of Classification Search
USPC .............................. 73/118.03, 147
See application file for complete search history.

(56) References Cited

U.S. PATENT DOCUMENTS

| 2,744,410 | A | * | 5/1956 | Browning | ..................... | 73/147 |
| 5,386,111 | A | * | 1/1995 | Zimmerman | .......... | 250/227.25 |
| 5,942,682 | A | * | 8/1999 | Ghetzler et al. | ................ | 73/147 |
| 6,725,912 | B1 | * | 4/2004 | Moll et al. | ..................... | 165/144 |
| 2012/0060536 | A1 | * | 3/2012 | Ahonen et al. | .................. | 62/304 |

FOREIGN PATENT DOCUMENTS

JP 04070535 A * 3/1992 ............. G01M 9/02

OTHER PUBLICATIONS

Potapczuk, "Simulating ice", MachineDesign.com, Aug. 2005, accessed Feb. 17, 2012, 6 pages, http://machinedesign.com/article/simulating-ice-0818.
"Large Climatic Wind Tunnel (LWT)", Rail Tec Arsenal, Vienna Climatic Wind Tunnel, accessed Feb. 17, 2012, 2 pages, http://www.rta.co.at/index.php/en/facility/customer-area/large-climatic-wind-tunnel-lwt.

* cited by examiner

*Primary Examiner* — Freddie Kirkland, III
(74) *Attorney, Agent, or Firm* — Yee & Associates, P.C.

(57) ABSTRACT

A method and apparatus for an icing simulation system. The icing simulation system comprises a wind tunnel, a nozzle system, and a controller. The nozzle system is configured to spray drops of water within the wind tunnel. The controller is configured to control a number of properties of the water in the nozzle system such that the nozzle system sprays the drops of the water with different sizes for a desired type of icing condition.

20 Claims, 8 Drawing Sheets

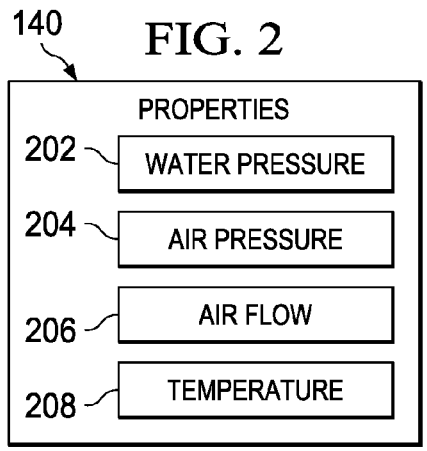
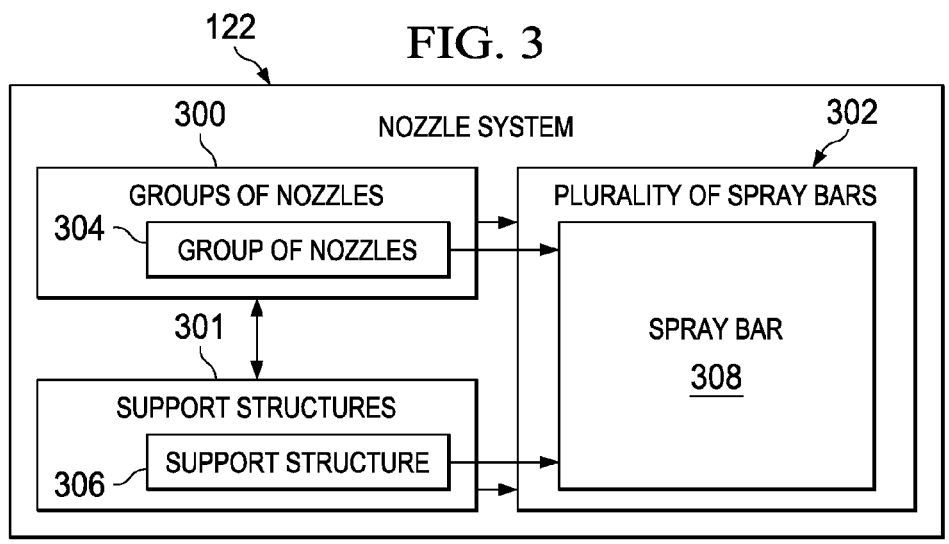
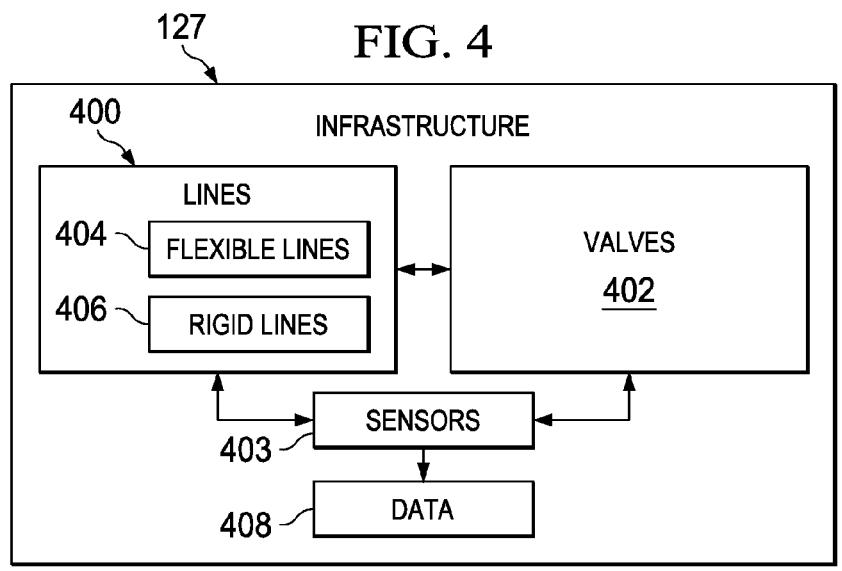

FIG. 9
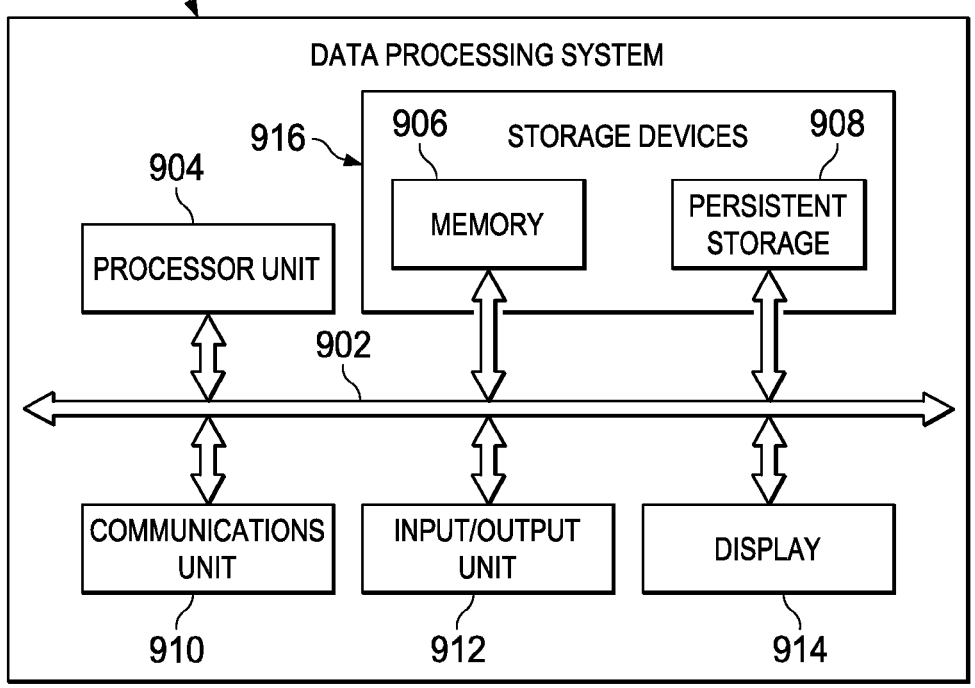
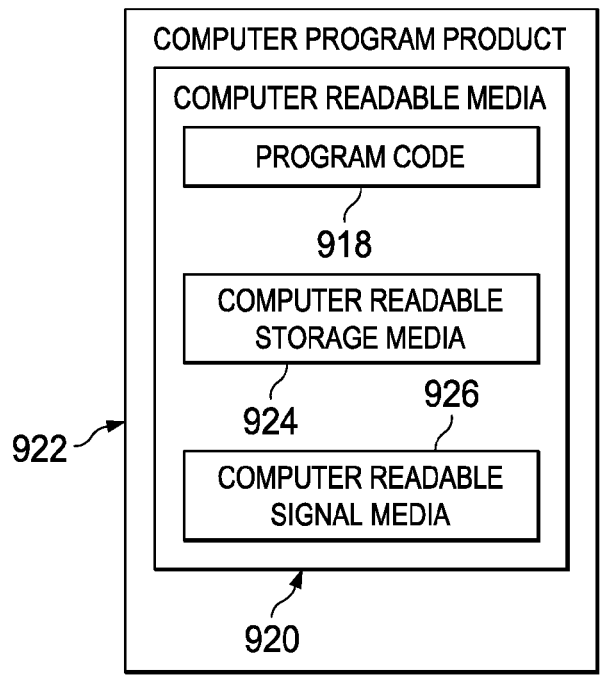

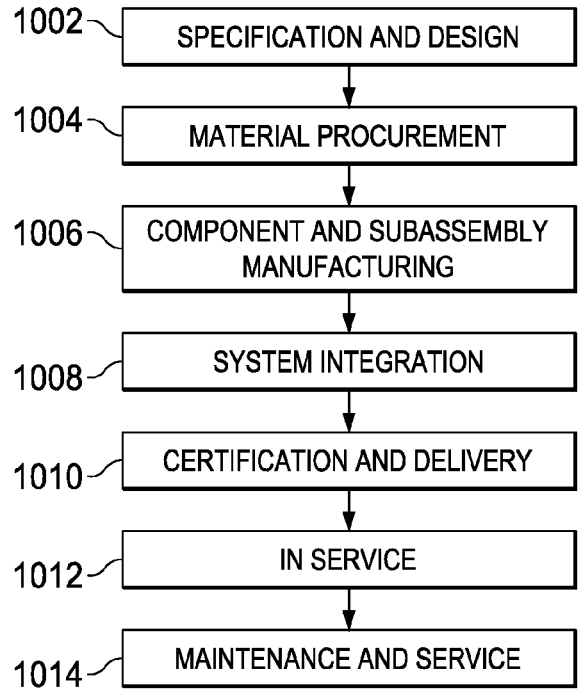
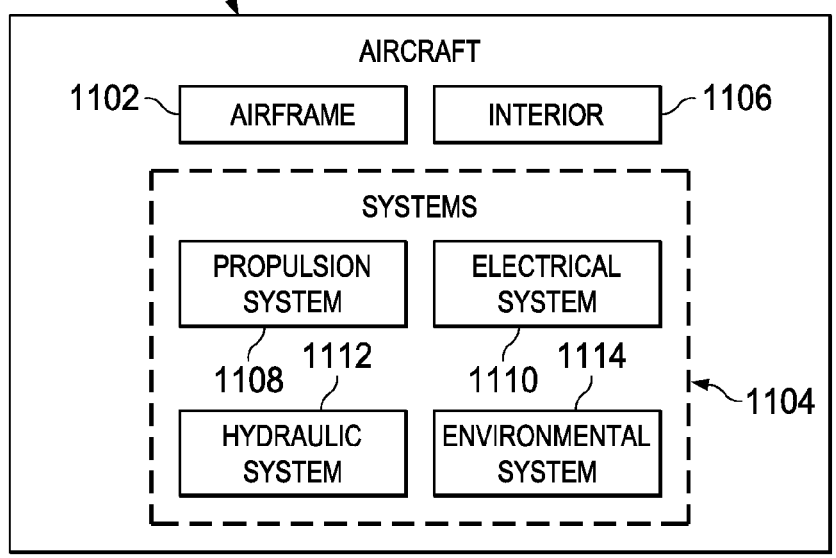

SUPERCOOLED LARGE DROP ICING CONDITION SIMULATION SYSTEM

BACKGROUND INFORMATION

1. Field

The present disclosure relates generally to icing conditions and, in particular, to simulating icing conditions. Still more particularly, the present disclosure relates to a method and apparatus for simulating icing conditions in which supercooled large drops are present.

2. Background

In aviation, icing on an aircraft may occur when the atmospheric conditions lead to the formation of ice on the surfaces of the aircraft. Further, this ice also may occur within the engine. Ice formation on the surfaces of the aircraft, on inlets of an engine, and other locations is undesirable and potentially unsafe for operating the aircraft.

Icing conditions may occur when drops of supercooled liquid water are present. In these illustrative examples, water is considered to be supercooled when the water is cooled below the stated freezing point for water but the water is still in a liquid form. Icing conditions may be characterized by the size of the drops, the liquid water content, the air temperature, and/or other parameters. These parameters may affect the rate and extent at which ice forms on an aircraft.

Drops of water may be supercooled in various environments. For example, drops of water may be supercooled in stratiform clouds and in cumulous clouds.

When icing occurs, the aircraft may not operate as desired. For example, ice on the wing of an aircraft will cause the aircraft to stall at a lower angle of attack and have an increased drag.

Aircraft may have mechanisms to prevent icing, remove ice, or some combination thereof to handle these icing conditions. For example, aircraft may include icing detection, prevention, and removal systems. Ice may be removed using bleed air, infrared heating, and other suitable mechanisms.

Aircraft may have sensor systems designed to detect icing conditions. As new regulations are developed with respect to icing conditions that should be detected, manufacturers design and test sensor systems for detecting the icing conditions. For example, aircraft may be required to be certified to operate in normal icing conditions and in supercooled large drop icing conditions.

In designing and testing sensor systems, currently available test environments may not provide an ability to simulate supercooled large drop icing conditions in the manner desired to test new sensor systems. Therefore, it would be desirable to have a method and apparatus that takes into account at least some of the issues discussed above as well as possibly other issues.

SUMMARY

In one illustrative embodiment, an icing simulation system comprises a wind tunnel, a nozzle system, and a controller. The nozzle system is configured to spray drops of water within the wind tunnel. The controller is configured to control a number of properties of the water in the nozzle system such that the nozzle system sprays the drops of water with different sizes for a desired type of icing condition.

In another illustrative embodiment, a method for simulating a desired type of icing condition in a wind tunnel is present. A number of properties is controlled for water sent to a nozzle system. The number of properties is controlled such that drops of the water have different sizes associated with the desired type of icing condition. The drops of water are sprayed from the nozzle system in the wind tunnel. The drops of the water sprayed by the nozzle system have different sizes for the desired type of icing condition.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 2 is an illustration of a block diagram of properties controlled by a controller in accordance with an illustrative embodiment;

FIG. 3 is an illustration of a block diagram of a nozzle system in accordance with an illustrative embodiment;

FIG. 4 is an illustration of a block diagram of an infrastructure in an icing simulation system in accordance with an illustrative embodiment;

FIG. 9 is an illustration of a data processing system in accordance with an illustrative embodiment;

FIG. 10 is an illustration of an aircraft manufacturing and service method in accordance with an illustrative embodiment; and FIG. 11 is an illustration of an aircraft in which an illustrative embodiment may be implemented.

DETAILED DESCRIPTION

The illustrative embodiments recognize and take into account one or more different considerations. For example, the illustrative embodiments recognize and take into account that currently available systems for simulating icing conditions are unable to simulate supercooled large drop icing conditions. In particular, the illustrative embodiments recognize and take into account that simulating this type of icing condition involves generating drops of water having two ranges of sizes. These ranges may be two different distributions of water drop sizes. This type of distribution may take the form of a supercooled large drop bimodal distribution.

For example, the illustrative embodiments recognize and take into account that currently available wind tunnels used to simulate icing conditions are unable to generate drops of water having the two ranges of sizes for supercooled large drop icing conditions.

Thus, one or more illustrative embodiments provide a method and apparatus for simulating icing conditions. In one illustrative embodiment, an icing simulation system comprises a wind tunnel, a nozzle system, and a controller. The nozzle system is configured to spray drops of water within the wind tunnel. The controller is configured to control a number of properties of the water in the nozzle system such that the nozzle system sprays the drops of water with different sizes for a desired type of icing condition.

Figure 1:
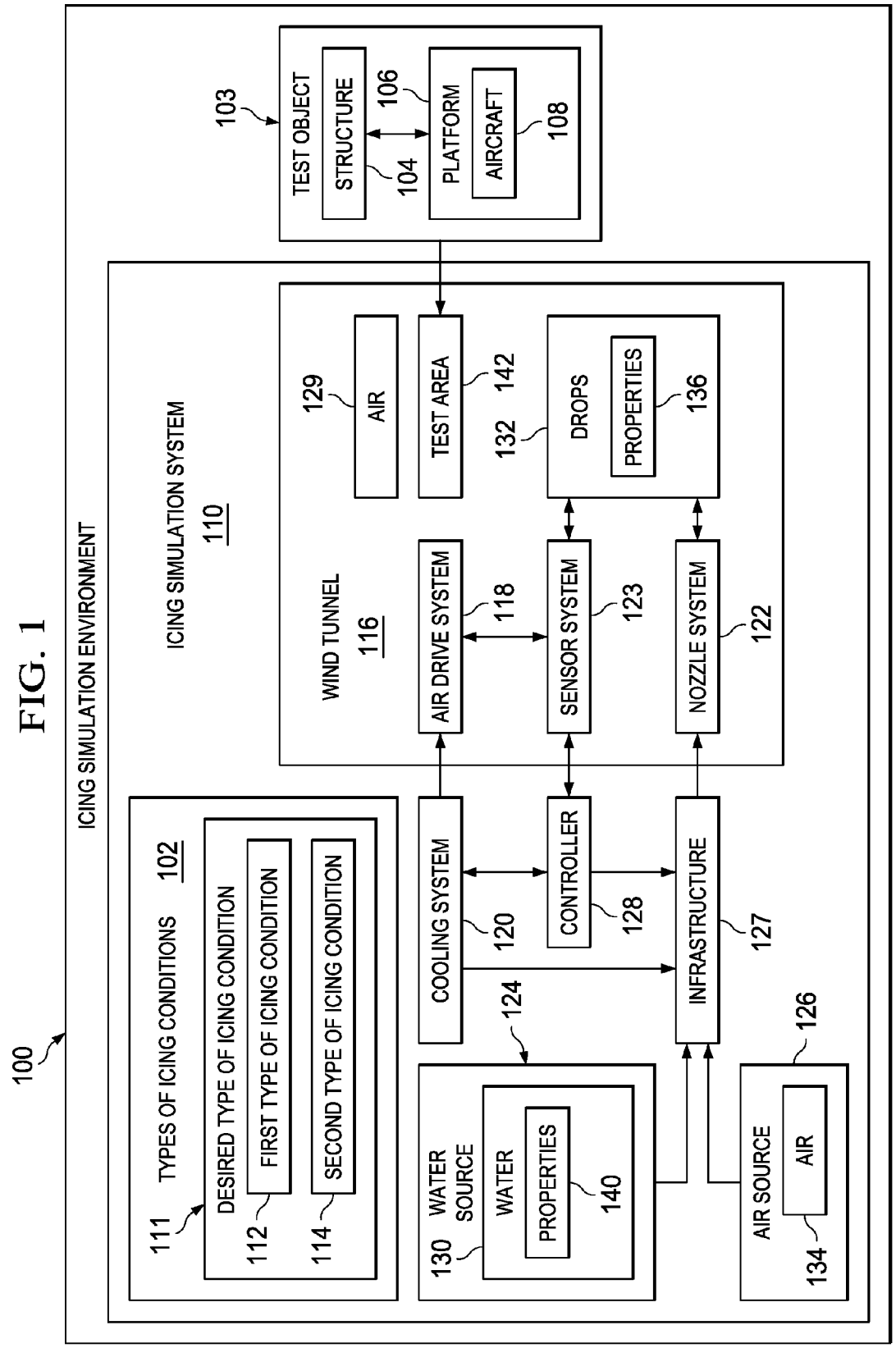
FIG. 1 is an illustration of a block diagram of an icing simulation environment in accordance with an illustrative embodiment.

With reference now to the figures and, in particular, with reference to FIG. 1, an illustration of a block diagram of an icing simulation environment is depicted in accordance with an illustrative embodiment. In this illustrative example, icing simulation environment 100 may be used to simulate types of icing conditions 102.

In particular, types of icing conditions 102 may be simulated for test object 103. Test object 103 may be, for example, structure 104, platform 106, or both. Structure 104 may be a structure in platform 106. When platform 106 takes the form of aircraft 108, structure 104 may be a structure in aircraft 108. For example, structure 104 may be a wing, a horizontal stabilizer, a vertical stabilizer, an engine, a landing gear system, a fuselage, a flap, an aircraft windshield, or some other suitable structure.

In one illustrative embodiment, icing simulation system 110 may be used to simulate desired type of icing condition 111 in one or more of types of icing conditions 102 for test object 103. Desired type of icing condition 111 is a type of icing condition for which testing is desired with respect to test object 103.

In particular, icing simulation system 110 may be used to simulate desired type of icing condition 111 as first type of icing condition 112, second type of icing condition 114, or both.

In these illustrative examples, first type of icing condition 112 and second type of icing condition 114 in types of icing conditions 102 may differ from each other based on drop size. The drop size may differ based on a mean volumetric diameter. More specifically, the drop sizes may differ based on ranges of sizes. In other words, first type of icing condition 112 may have one range of sizes, and second type of icing condition 114 may have another range of sizes. The distribution of sizes within the ranges also may be used to define different types of icing conditions.

In these illustrative examples, first type of icing condition 112 may be present when the size of the drops is from about 0.00465 millimeters in diameter to about 0.111 millimeters in diameter. Drops with these sizes may be referred to as normal drops.

Second type of icing condition 114 may be present when the size of the drops includes drops that have a diameter greater than about 0.111 millimeters.

Drops having a size greater than about 0.111 millimeters may be referred to as large drops and, in particular, may be called supercooled large drops under the altitude, temperature, and liquid water content conditions described above. For example, the drops may have a diameter in a range from about 0.112 millimeters to about 2.2 millimeters. In addition, second type of icing condition 114 may include drops that are 0.111 millimeters or less when drops greater than 0.111 millimeters are present. In other words, second type of icing condition 114 includes both normal drops and large drops of water.

In simulating desired type of icing condition 111, liquid water content in the drops may also be used to characterize the type of icing condition. For example, first type of icing condition 112 may have liquid water content in the range of about 0.04 grams per cubic meter to about 2.8 grams per cubic meter. On the other hand, second type of icing condition 114 may have liquid water content in the range of about 0.19 grams per cubic meter to about 0.44 grams per cubic meter.

In the depicted examples, icing simulation system 110 is a physical system that also may include software. Icing simulation system 110 includes wind tunnel 116, air drive system 118, cooling system 120, nozzle system 122, sensor system 123, water source 124, air source 126, infrastructure 127, controller 128, and other suitable components.

As depicted, air drive system 118 causes air 129 to flow within wind tunnel 116. Cooling system 120 may cool the temperature of air 129 within wind tunnel 116.

Infrastructure 127 comprises components that carry water 130 and air 134 to nozzle system 122. In particular, infrastructure 127 connects water source 124 and air source 126 to nozzle system 122. Additionally, infrastructure 127 also may be connected to cooling system 120. The connection to cooling system 120 may be used to cool water 130, air 134, or both. Additionally, infrastructure 127 also may be connected to cooling system 120. The connection to cooling system 120 may be used to cool water 130, air 134, or both.

Nozzle system 122 receives water 130 from water source 124 through infrastructure 127 and generates drops 132 of water 130. In other words, drops 132 of water 130 are generated by water 130 flowing through nozzle system 122.

In some illustrative examples, air 134 received through infrastructure 127 may be introduced into water 130 as water 130 flows through nozzle system 122 to form drops 132 of water 130. In these illustrative examples, air source 126 also may send air 134 to nozzle system 122 via infrastructure 127. Within nozzle system 122, air 134 may be mixed with water 130 to form drops 132 of water 130 sprayed by nozzle system 122.

In these illustrative examples, drops 132 of water 130 generated by nozzle system 122 may have properties 136 to simulate first type of icing condition 112, second type of icing condition 114, or both. In these illustrative examples, properties 136 of drops 132 of water 130 may include, for example, without limitation, size, water content, temperature, and other suitable properties.

Sensor system 123 is configured to generate data about one or more of properties 136 of drops 132 of water 130. In other words, sensor system 123 identifies properties 136 of drops 132 of water 130 generated by nozzle system 122 within wind tunnel 116.

Controller 128 is configured to control properties 140 of water 130 to simulate at least one of first type of icing condition 112, second type of icing condition 114, or both.

Controller 128 may use data from sensor system 123 to adjust values for a number of properties in properties 140 of water 130 to obtain desired type of icing condition 111 within types of icing conditions 102. In other words, sensor system 123 provides feedback to controller 128 about drops 132 of water 130. The data received from sensor system 123 may be used to adjust properties 140 of water 130 if properties 136 for drops 132 of water 130 do not have desired values for desired type of icing condition 111.

The adjustment of properties 140 of water 130 made by controller 128 may be made at different times during testing. For example, the adjustment may be made prior to placing test object 103 into wind tunnel 116 for testing of desired type of icing condition 111. Additionally, these adjustments may be made while the simulation of desired type of icing condition 111 is performed on test object 103. In other words, adjustments may be made dynamically during the testing to maintain desired type of icing condition 111.

In these illustrative examples, controller 128 is comprised of hardware, software, or both. For example, controller 128 may be a computer system. The computer system may include one or more computers. When more than one computer is present in the computer system, those computers may be in communication with each other through a network. In other illustrative examples, controller 128 may be implemented using hardware with circuits configured to perform operations to simulate types of icing conditions 102.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

As depicted, test object 103 may be placed in test area 142 in wind tunnel 116 for exposure to drops 132 of water 130. By controlling properties 140 for water 130, drops 132 of water 130 may be generated by properties 136 to simulate desired type of icing condition 111.

This simulation of desired type of icing condition 111 may be used to determine how test object 103 may function. For example, test object 103 may be an airfoil with sensors configured to detect icing conditions. By simulating desired type of icing condition 111, a determination may be made as to whether the sensors are able to detect desired type of icing condition 111. In these illustrative examples, desired type of icing condition 111 may be a supercooled large drop icing condition.

Turning now to FIG. 2, an illustration of a block diagram of properties controlled by a controller is depicted in accordance with an illustrative embodiment. Examples of properties 140 of water 130 that may be controlled by controller 128 to obtain properties 136 for drops 132 to simulate desired type of icing condition 111 in types of icing conditions 102 in FIG. 1 are shown in this illustrative example.

In these illustrative examples, properties 140 include at least one of water pressure 202, air pressure 204, air flow 206, temperature 208, and other suitable properties. Properties 140 controlled by controller 128 may be selected from one or more of properties 140.

Water pressure 202 is the pressure of water 130 in nozzle system 122 in FIG. 1. Air pressure 204 is the pressure of air 134 introduced into nozzle system 122. Air flow 206 is the speed at which air moves within wind tunnel 116. Temperature 208 is the temperature of water 130 in nozzle system 122. Temperature 208 may be selected to be near or below freezing for water 130 prior to water 130 being sprayed as drops 132 from nozzle system 122. The selection of temperature 208 is such that water 130 does not freeze within nozzles in nozzle system 122.

In these illustrative examples, values for at least one of water pressure 202, air pressure 204, and air flow 206 of properties 140 may be selected to obtain properties 136 of drops 132 that are desired for desired type of icing condition 111. These properties may include at least one of, for example, without limitation, size, water content, temperature, and other suitable properties for drops 132 of water 130 in a manner that produces desired type of icing condition 111 in types of icing conditions 102.

The values for properties 140 may change, depending on the particular type of icing condition in types of icing conditions 102. In other words, the values of properties 140 selected for first type of icing condition 112 are different from the values of properties 140 selected for second type of icing condition 114.

For example, air pressure 204 may be from about 10 psi to about 60 psi, and water pressure 202 may be from about 20 psi to about 240 psi. This combination of air pressure 204 and water pressure 202 may produce water drops having sizes of up to about 0.050 millimeters. The size of the water drops may be increased by changing the pressure of the water relative to the pressure of the air.

For example, air pressure 204 may be changed by a magnitude relative to water pressure 202. For example, water pressure 202 may be about 80 psi, and air pressure 204 may be about 8 psi. With this setting, the drops of water may be about 0.500 millimeters.

In some illustrative examples, air pressure 204 may be from about 10 psi to about 60 psi. Water pressure 202 may be from about 10 psi to about 240 psi. Of course, the values of water pressure 202 and air pressure 204 may change, depending on the types of nozzles used.

With reference now to FIG. 3, an illustration of a block diagram of a nozzle system is depicted in accordance with an illustrative embodiment. Examples of components for nozzle system 122 are illustrated in this figure.

As depicted, nozzle system 122 is comprised of groups of nozzles 300 and support structures 301. In these illustrative examples, a group of nozzles within groups of nozzles 300 includes one or more nozzles. Further, one group of nozzles within groups of nozzles 300 may have a different number of nozzles than another group of nozzles within groups of nozzles 300.

Support structures 301 are configured to be associated with groups of nozzles 300. When one component is "associated" with another component, the association is a physical association in these depicted examples. For example, a first component, group of nozzles 304 in groups of nozzles 300, may be considered to be associated with a second component, support structure 306 in support structures 301, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component. Further, the association may be a temporary association in which the first component may be removed from the second component or vice versa.

Support structures 301 may also be configured to receive water and direct water to groups of nozzles 300. In these illustrative examples, support structures 301 may include lines, valves, or other components that may be used to control the flow of water within support structures 301. In some illustrative examples, support structures 301 also may include sensors used to generate data about water flowing through support structures 301.

As depicted, the association of groups of nozzles 300 with support structures 301 forms plurality of spray bars 302. Each group of nozzles in groups of nozzles 300 is associated with a support structure in support structures 301. For example, the association of group of nozzles 304 with support structure 306 forms spray bar 308.

In these illustrative examples, properties 140 in FIG. 2 may be controlled with different levels of granularity. For example, each group of nozzles in groups of nozzles 300 may have different values for properties 140 as compared to other groups of nozzles.

In still other illustrative examples, when more than one nozzle is in group of nozzles 304, values for properties 140 may be controlled individually for each nozzle in group of nozzles 304. In other words, one group of nozzles in groups of nozzles 300 may spray drops 132 of water 130 in FIG. 1 with a different size or range of sizes as compared to another group of nozzles in groups of nozzles 300 through the control of properties 140 for these two groups of nozzles. In this manner, the sizes of drops 132 of water 130 may be achieved using groups of nozzles 300 to obtain a desired type of icing condition within types of icing conditions 102 in FIG. 1.

Turning now to FIG. 4, an illustration of a block diagram of an infrastructure in an icing simulation system is depicted in accordance with an illustrative embodiment. In this illustrative example, examples of some components that may be present in infrastructure 127 include lines 400, valves 402, and sensors 403 are shown. Lines 400 may include, for example, flexible lines 404 and rigid lines 406.

In these illustrative examples, lines 400 may be used to connect water source 124 and air source 126 to nozzle system 122 in FIG. 1. Further, some of lines 400 may be connected to cooling system 120 in FIG. 1.

Valves 402 are associated with lines 400. Valves 402 may be operated to control the flow of fluids through lines 400. In these illustrative examples, these fluids may be water 130 and air 134 in FIG. 1. In these illustrative examples, the operation of valves 402 is controlled by controller 128. Controller 128 operates valves 402 to select values for properties 140 in FIG. 1.

Sensors 403 are configured to detect the values of properties 140. Additionally, sensors 403 also may be configured to detect the position of valves 402, the flow of liquids through lines 400, and other suitable parameters.

As depicted, sensors 403 may be associated with lines 400 and valves 402. Further, sensors 403 also may be associated with nozzle system 122.

Sensors 403 generate data 408 that is sent to controller 128. Controller 128 operates valves 402 to adjust the values of properties 140.

The illustration of icing simulation environment 100 in FIG. 1 and the components of icing simulation environment 100 in FIGS. 1-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, one or more test objects in addition to test object 103 may be placed in test area 142 during simulation of desired type of icing condition 111 using icing simulation system 110. Also, test object 103 may take other forms other than an aircraft or objects that are for or part of an aircraft. For example, test object 103 may be selected from one of an automobile windshield, automobile, a ship, an engine hood, a deck of a ship, and other suitable test objects.

In still other illustrative examples, valves 402, sensors 403, or both may be considered part of controller 128. In still other illustrative examples, additional types of icing conditions in addition to or in place of first type of icing condition 112 and second type of icing condition 114 in types of icing conditions 102 may be present. For example, in some types of icing conditions, three or more ranges of sizes for drops 132 of water 130 may be present for those types of icing conditions.

Figure 5:
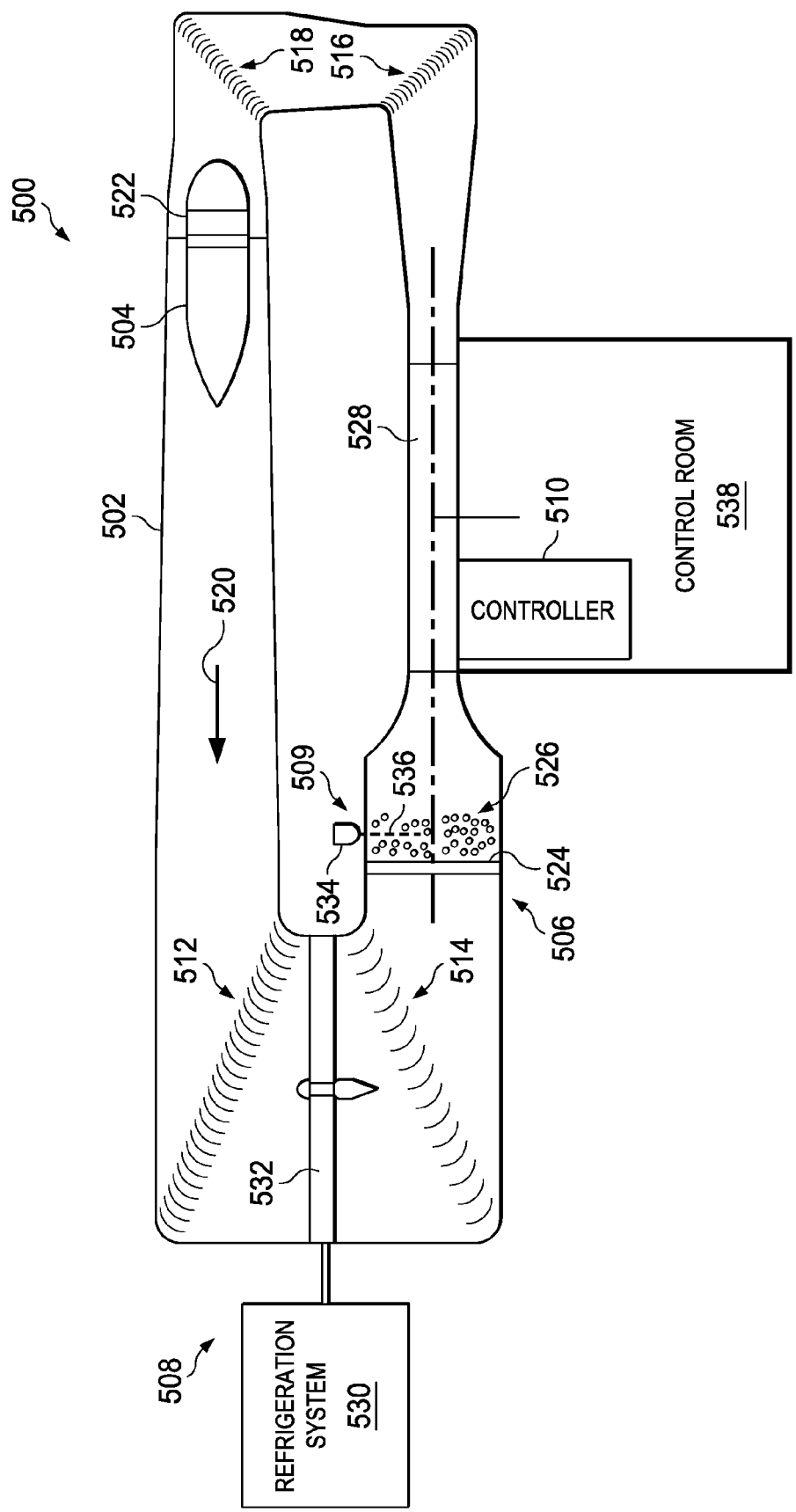
FIG. 5 is an illustration of an icing simulation system in accordance with an illustrative embodiment.

Turning now to FIG. 5, an illustration of an icing simulation system is depicted in accordance with an illustrative embodiment. In this depicted example, icing simulation system 500 is one example of a physical implementation for icing simulation system 110 shown in block form in FIG. 1.

In this illustrative example, a top view of icing simulation system 500 is shown. As depicted, icing simulation system 500 includes wind tunnel 502, air drive system 504, nozzle system 506, cooling system 508, and controller 510.

In this depicted example, wind tunnel 502 has turning vane 512, turning vane 514, turning vane 516, and turning vane 518. These turning vanes aid in directing air flow 520 generated by air drive system 504 to turn or curve within wind tunnel 502.

As depicted, air flow 520 is generated by air drive system 504. In this illustrative example, air drive system 504 comprises fan system 522. In this illustrative example, nozzle system 506 comprises spray bars 524.

In these illustrative examples, spray bars 524 are configured to spray drops of water 526 within wind tunnel 502. Drops of water 526 are carried by air flow 520 through test section 528 within wind tunnel 502.

In these illustrative examples, air flow 520 is cooled using cooling system 508. As depicted, cooling system 508 comprises refrigeration system 530 and heat exchanger 532. Refrigeration system 530 and heat exchanger 532 operate to cool air within air flow 520 passing by or through heat exchanger 532.

In this illustrative example, sensor system 509 takes the form of laser sensor system 534. Laser sensor system 534 sends laser beam 536 into wind tunnel 502 where drops of water 526 are generated by spray bars 524 in nozzle system 506. Laser sensor system 534 sends data about sizes of drops of water 526 to controller 510 in control room 538.

With feedback from laser sensor system 534 in sensor system 509, controller 510 may adjust properties of water sent through spray bars 524 in nozzle system 506 to obtain desired sizes for drops of water 526 to simulate a desired type of icing condition.

In these illustrative examples, drops of water 526 may have two ranges of sizes for the desired icing condition. In particular, the desired icing condition may be a supercooled large drop icing condition. In these illustrative examples, drops of water 526 may include sizes for normal drops and sizes for supercooled large drops.

Figure 6:
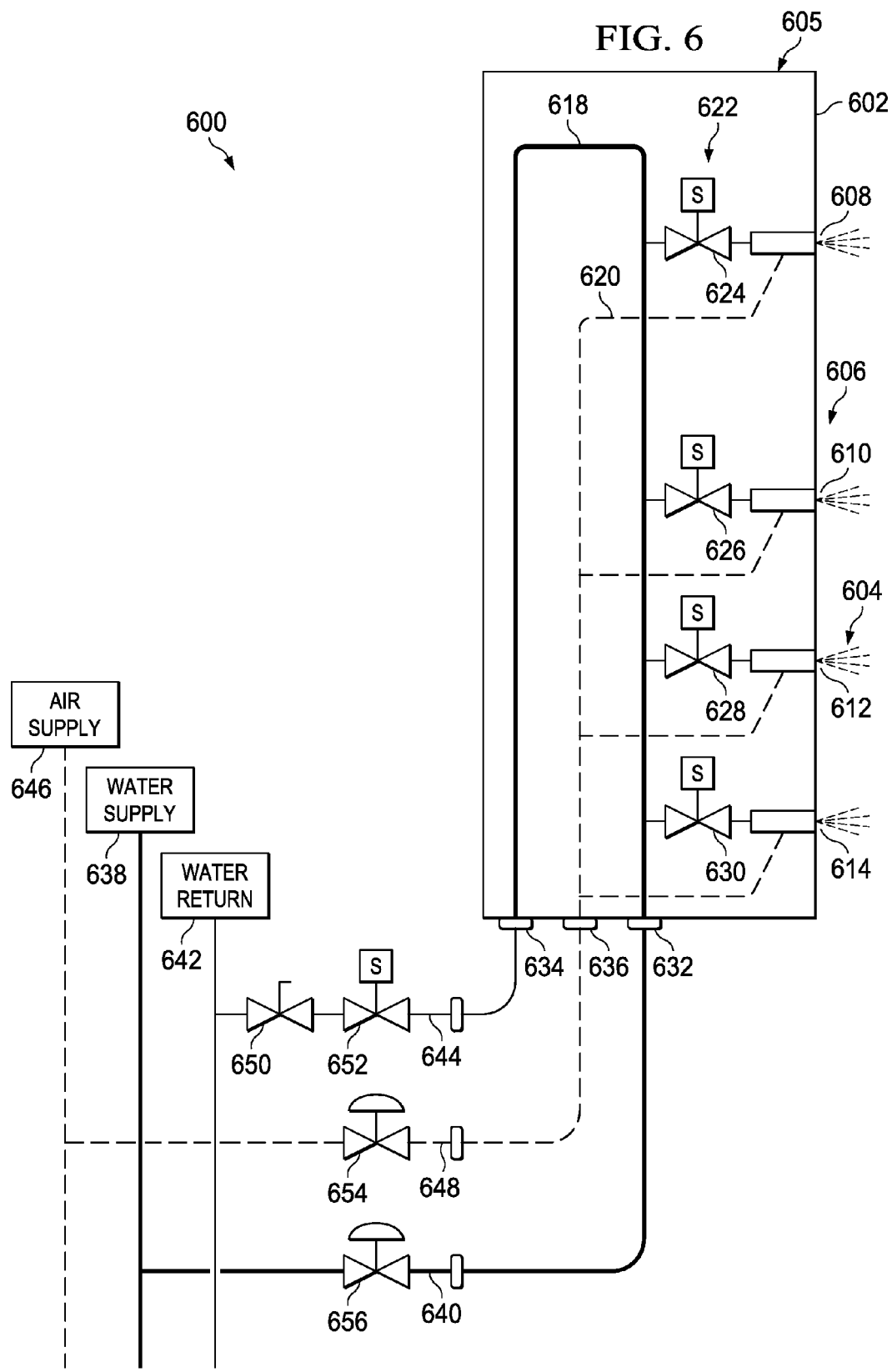
FIG. 6 is an illustration of a spray bar balancing system in accordance with an illustrative embodiment.

Turning now to FIG. 6, an illustration of a spray bar balancing system is depicted in accordance with an illustrative embodiment. As depicted, spray bar balancing system 600 may be implemented in a number of different places within icing simulation system 110 in FIG. 1. For example, spray bar balancing system 600 may be implemented as part of infrastructure 127, nozzle system 122, or a combination of the two in FIG. 1.

In this illustrative example, spray bar balancing system 600 may be used to control spray bar 602 in a manner that allows for drops 604 of water to be produced with a desired size and temperature more quickly to form a desired icing cloud for a desired type of icing condition.

As described above, the drop size may be defined by the mean volumetric diameter of the drops of water and/or the liquid water content in the drops of water. These parameters are functions of the pressure of air in spray bar 602 and the change in pressure of air in spray bar 602, as well as the velocity of the drops of water within the tunnel.

In this illustrative example, spray bar 602 is comprised of support structure 605 and nozzles 606. In this example, nozzles 606 include nozzle 608, nozzle 610, nozzle 612, and nozzle 614. Support structure 605 contains water line 618 and air line 620. Water line 618 supplies water to nozzles 606, and air line 620 supplies air to nozzles 606.

In these illustrative examples, valves 622 in support structure 605 control water that passes through nozzles 606. As depicted, valves 622 include valve 624, valve 626, valve 628, and valve 630. These valves are associated with nozzle 608, nozzle 610, nozzle 612, and nozzle 614, respectively.

In these illustrative examples, support structure 605 in spray bar 602 has water input 632 and water return output 634. Additionally, support structure 605 has air input 636. Water input 632 is connected to water supply 638 by line 640. Water return output 634 is connected to water return 642 by line 644. Air input 636 is connected to air supply 646 by line 648. Needle valve 650 and bypass valve 652 are associated with line 644. Air valve 654 is associated with line 648. Pressure valve 656 is associated with line 640.

In this illustrative example, spray bar 602 may operate in a spray mode and a bypass mode. In bypass mode, spray bar 602 does not spray drops 604 of water. In this mode, valves 622 are closed and bypass valve 652 is open. In this manner, water flowing from water supply 638 may flow through water line 618 in support structure 605 of spray bar 602. This water may flow out of spray bar 602 at water return output 634 and through line 644 to water return 642.

When in the bypass mode, pressure valve 656 may be adjusted to supply water at a desired pressure level for a desired type of icing condition. In this manner, the desired pressure may be present before switching to a spray mode.

When spray bar 602 is placed into a spray mode, valves 622 are opened, and bypass valve 652 is closed. In the spray mode, drops 604 of water are sprayed out of nozzles 606 from spray bar 602. Drops 604 of water form an icing cloud in these illustrative examples. Drops 604 of water have properties that simulate a desired icing condition.

In spray mode, valves 622 are open to allow drops 604 of water to be sprayed out of nozzles 606. Additionally, air valve 654 and pressure valve 656 are also open. Bypass valve 652 is closed.

With air valve 654 open, air may flow from air supply 646 through line 648 into air line 620 through air input 636 to reach nozzles 606. Additionally, water may flow from water supply 638 through line 640 into water input 632 to reach nozzles 606.

In these illustrative examples, this operation of the valves may cause a change in the pressure of the water flowing to nozzles 606. Needle valve 650 is located downstream of bypass valve 652 and is configured to balance the flow of water during the change from a bypass mode to a spray mode. In this manner, any change in the pressure of the water may be reduced such that the change does not affect the spraying of drops 604 of water in a manner that affects simulating the desired icing condition. In other words, the properties of drops 604 of water may reach desired properties for the desired icing condition more quickly with this configuration.

The different components shown in FIGS. 5-6 may be combined with components in FIGS. 1-4, used with components in FIGS. 1-4, or a combination of the two. Additionally, some of the components in FIGS. 5-6 may be illustrative examples of how components shown in block form in FIGS. 1-4 can be implemented as physical structures.

Figure 7:
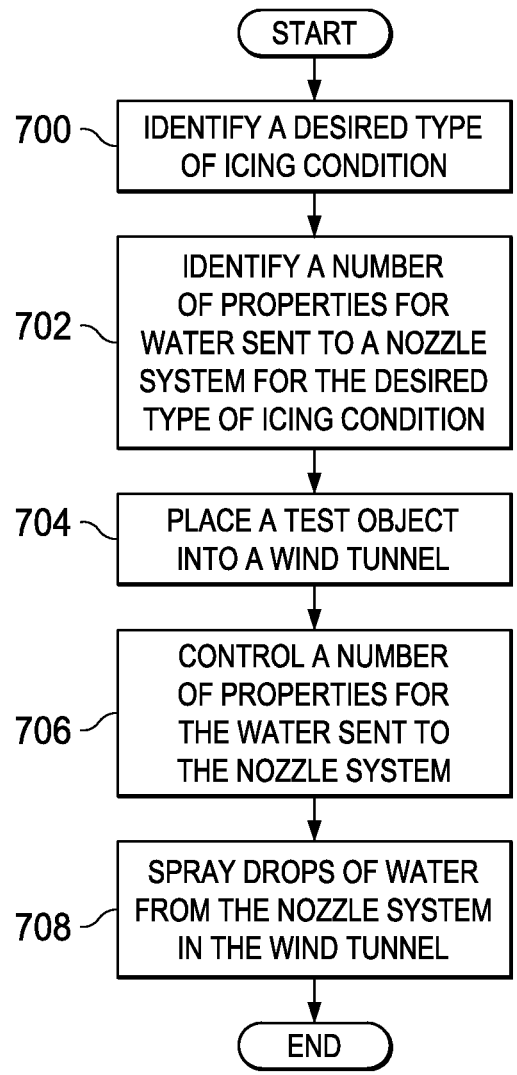
FIG. 7 is an illustration of a flowchart of a process for simulating icing conditions in accordance with an illustrative embodiment.

With reference now to FIG. 7, an illustration of a flowchart of a process for simulating icing conditions is depicted in accordance with an illustrative embodiment. The process illustrated in FIG. 7 may be implemented in icing simulation environment 100 in FIG. 1. In particular, the process may be implemented in icing simulation system 110.

The process begins by identifying a desired type of icing condition (operation 700). The process identifies a number of properties for water sent to a nozzle system for the desired type of icing condition (operation 702).

Next, a test object is placed into a wind tunnel (operation 704). A number of properties for the water sent to the nozzle system is controlled (operation 706). In these illustrative examples, the number of properties is controlled such that drops of water have sizes associated with the type of icing condition. In other words, the values for the properties are selected such that drops of water have sizes that are characteristic of the type of icing condition to be simulated.

For example, with a supercooled large drop icing condition, the drops of water may include normal drops and large drops as described above. Further, the water also may have a desired temperature that can be reached as the drops of water travel in the wind tunnel.

Drops of water are then sprayed from the nozzle system in the wind tunnel (operation 708), with the process terminating thereafter. The drops of water sprayed by the nozzle system have different sizes that correspond to the desired type of icing condition. These different sizes may be different ranges, depending on the type of icing condition.

In this manner, the simulation of the icing condition in a wind tunnel allows for a test object to be tested to see how the test object performs in the desired icing condition. For example, sensor systems for detecting icing conditions may be tested using this process without placing the sensors on an aircraft and flying the aircraft into weather with the desired icing condition.

Figure 8:
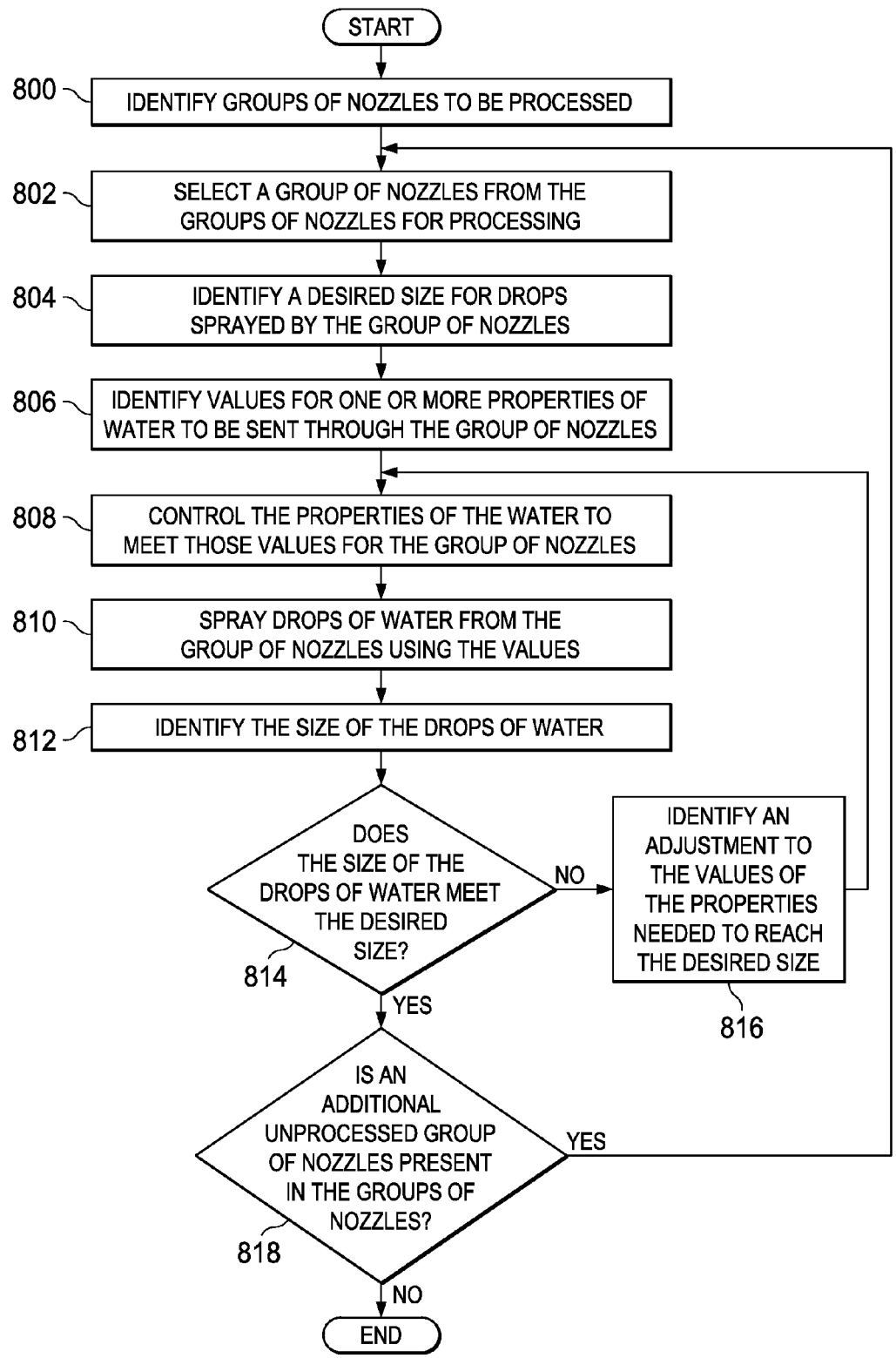
FIG. 8 is an illustration of a flowchart of a process for calibrating an icing simulation system in accordance with an illustrative embodiment.

With reference now to FIG. 8, an illustration of a flowchart of a process for calibrating an icing simulation system is depicted in accordance with an illustrative embodiment. This process may be used to set icing simulation system 110 to produce drops 132 of water 130 with desired sizes for desired type of icing condition 111 in FIG. 1.

The process begins by identifying groups of nozzles to be processed (operation 800). The process then selects a group of nozzles from the groups of nozzles for processing (operation 802).

The process identifies a desired size for drops sprayed by the group of nozzles (operation 804). Next, the process identifies values for one or more properties of water to be sent through the group of nozzles (operation 806). The properties of the water are controlled to meet those values for the group of nozzles (operation 808). Drops of water are then sprayed from the group of nozzles using the values (operation 810).

Next, the size of the drops of water is identified (operation 812). The size of the drops of water may be identified using a sensor system, such as sensor system 123 in FIG. 1. A determination is made as to whether the size of the drops of water meet the desired size (operation 814). The desired size may be met if the size of the drops of water identified are the same as the desired size. In these illustrative examples, the desired size also may be met, in some cases, if the size of the drops of water are within a range of the desired size.

If the size of the drops of water does not meet the desired size, an adjustment to the values of the properties needed to reach the desired size is identified (operation 816). The process then returns to operation 808.

With reference again to operation 814, if the desired size of the drops of water is met, a determination is made as to whether an additional unprocessed group of nozzles is present in the groups of nozzles (operation 818). If an additional unprocessed group of nozzles is present, the process returns to operation 802. Otherwise, the process terminates.

Although this process may be used to calibrate the groups of nozzles prior to simulating a desired type of icing condition, this process may also be used at other times. For example, this process also may be used while the desired type of icing condition is being simulated. The process may be used to adjust the manner in which drops of water are sprayed such that the desired type of icing condition can be maintained even though other parameters in the icing simulation environment may change.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 9, an illustration of a data processing system is depicted in accordance with an illustrative embodiment. Data processing system 900 may be used to implemented controller 128 in FIG. 1. In this illustrative example, data processing system 900 includes communications framework 902, which provides communications between processor unit 904, memory 906, persistent storage 908, communications unit 910, input/output (I/O) unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code 918.

Illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10.

As yet another example, one or more apparatus embodiments, method embodiments, or a combination thereof may be utilized during production stages, such as specification and design 1002 and system integration 1008 in FIG. 10. For example, icing simulation system 110 may be used to test various prototypes of components or structures during specification and design 1002.

One or more apparatus embodiments, method embodiments, or a combination thereof may be utilized while aircraft 1100 is in service 1012 and/or during maintenance and service 1014. For example, icing simulation system 110 may be used to test upgrades or changes to aircraft 1100 made during maintenance and service 1014. For example, if new or different sensor systems for detecting icing conditions are added to aircraft 1100, icing simulation system 110 may be used to determine whether those sensors perform as desired. The use of a number of the different illustrative embodiments may substantially expedite the assembly of and/or reduce the cost of aircraft 1100.

Thus, one or more illustrative embodiments provide a method and apparatus for simulating icing conditions. The simulation of the icing conditions may be used to determine whether a test object performs as desired during different types of icing conditions. For example, as requirements change on what types of icing conditions are required to be detected by an aircraft, sensor systems for those types of icing conditions may be designed and tested using an illustrative embodiment.

For example, icing simulation system 110 provides an ability to generate water drops having different sizes. In particular, the water drops may have two ranges of sizes. These ranges may be ranges that represent supercooled large drop icing conditions. The ranges may be generated by controlling different spray bars within icing simulation system 110 to spray drops of water with different sizes. In this manner, the spray bars may generate drops of water having the two desired ranges of drop sizes for supercooled large drop icing conditions.

With icing simulation system 110, recreating a desired icing condition may reduce the amount of time needed to meet regulations regarding the icing conditions. Further, with the use of icing simulation system 110, the time, effort, and/or expense needed to certify an aircraft or icing detection system may be reduced.

Of course, icing simulation system 110 may be used to generate icing conditions other than those described in the illustrative examples. For example, other icing conditions may include three or more ranges of drop sizes.

The description of the different illustrative embodiments has been presented for purposes of illustration and description, and is not intended to be exhaustive or limited to the embodiments in the form disclosed. Many modifications and variations will be apparent to those of ordinary skill in the art.

Although an illustrative embodiment has been described with respect to aircraft, the illustrative embodiment may be applied to other types of platforms and structures for those platforms. For example, without limitation, other illustrative embodiments may be applied to a mobile platform, a stationary platform, a land-based structure, an aquatic-based structure, a space-based structure, and/or some other suitable platform or structure for those platforms. More specifically, the different illustrative embodiments may be applied to, for example, without limitation, a submarine, a bus, a personnel carrier, a tank, a train, an automobile, a spacecraft, a space station, a satellite, a surface ship, and/or some other suitable platform.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An icing simulation system comprising:
   a wind tunnel;
   a nozzle system configured to spray drops of water within the wind tunnel; and
   a controller configured to control a number of properties of the water in the nozzle system such that the nozzle system sprays the drops of the water with different sizes for a desired type of icing condition.

2. The icing simulation system of claim 1, wherein the nozzle system comprises groups of nozzles.

3. The icing simulation system of claim 2, wherein in being configured to control the number of properties of the water in the nozzle system such that the nozzle system sprays the drops of the water with the different sizes for the desired type of icing condition, the controller is configured to select at least one of a water pressure, an air pressure, and a temperature for the water for each group of nozzles in the groups of nozzles such that the groups of nozzles spray the drops of the water with the different sizes for the desired type of icing condition.

4. The icing simulation system of claim 2, wherein a group of nozzles in the groups of nozzles is associated with a spray bar.

5. The icing simulation system of claim 4 further comprising:
a spray bar balancing system configured to reduce a time for the spray bar to spray the drops of the water with a desired size.

6. The icing simulation system of claim 1 further comprising:
a plurality of valves configured to control at least one of a water pressure, an air pressure, and a temperature for the water; and
a computer system configured to control an operation of the plurality of valves.

7. The icing simulation system of claim 1 further comprising:
a sensor system configured to detect a size of the drops of the water.

8. The icing simulation system of claim 1, wherein the desired type of icing condition is a supercooled large drop icing condition.

9. The icing simulation system of claim 1, wherein a second type of icing condition includes the drops of the water having a diameter greater than about 0.111 millimeters.

10. The icing simulation system of claim 9, wherein the desired type of icing condition further includes additional drops of the water having a diameter that is less than or equal to about 0.111 millimeters.

11. The icing simulation system of claim 1, wherein the wind tunnel includes a test section configured to hold a test object, and wherein the test object is selected from one of an airfoil, an aircraft, an engine, a wing, a horizontal stabilizer, a vertical stabilizer, a landing gear system, a fuselage, a flap, an aircraft windshield, an automobile windshield, an automobile, a ship, an engine hood, and a deck of a ship.

12. A method for simulating a desired type of icing condition in a wind tunnel, the method comprising:
controlling a number of properties for water sent to a nozzle system, wherein the number of properties is controlled such that drops of the water have different sizes associated with the desired type of icing condition; and
spraying the drops of the water from the nozzle system in the wind tunnel, wherein the drops of the water sprayed by the nozzle system have the different sizes for the desired type of icing condition.

13. The method of claim 12, wherein controlling the number of properties for the water sent to the nozzle system, wherein the number of properties is controlled such that the drops of the water have the different sizes associated with the desired type of icing condition comprises:
controlling at least one of a water pressure, an air pressure, and a temperature for the water sent to the nozzle system, wherein the number of properties is controlled such that the drops of the water have the different sizes associated with the desired type of icing condition.

14. The method of claim 12, wherein spraying the drops of the water from the nozzle system in the wind tunnel, wherein the drops of the water sprayed by the nozzle system have the different sizes for the desired type of icing condition comprises:
spraying the drops of the water from groups of nozzles in the nozzle system in the wind tunnel, wherein the drops of the water sprayed by the nozzle system have the different sizes for the desired type of icing condition.

15. The method of claim 14, wherein controlling the number of properties for the water sent to the nozzle system, wherein the number of properties is controlled such that the drops of the water have the different sizes associated with the desired type of icing condition comprises:
selecting at least one of a water pressure, an air pressure, and a temperature for the water for each group of nozzles in the groups of nozzles such that the groups of nozzles spray the drops of the water with the different sizes for the desired type of icing condition.

16. The method of claim 14, wherein spraying the drops of the water from the groups of nozzles in the nozzle system in the wind tunnel, wherein the drops of the water sprayed by the nozzle system have the different sizes for the desired type of icing condition comprises:
spraying the drops of the water from the groups of nozzles in the nozzle system in the wind tunnel, wherein the drops of the water sprayed by the nozzle system have the different sizes for the desired type of icing condition, wherein a group of nozzles in the groups of nozzles is associated with a spray bar.

17. The method of claim 12, wherein controlling the number of properties for the water sent to the nozzle system, wherein the number of properties is controlled such that the drops of the water have the different sizes associated with the desired type of icing condition comprises:
controlling the number of properties for the water sent to the nozzle system, wherein the number of properties is controlled such that the drops of the water have the different sizes associated with a supercooled large drop icing condition.

18. The method of claim 12 further comprising:
placing a test object in a test section of the wind tunnel, wherein the test object is selected from one an airfoil, an aircraft, an engine, a wing, a horizontal stabilizer, a vertical stabilizer, a landing gear system, a fuselage, a flap, an aircraft windshield, an automobile windshield, an automobile, a ship, an engine hood, and a deck of a ship.

19. An icing simulation system comprising:
a wind tunnel;
a nozzle system configured to spray drops of water within the wind tunnel; and
a controller configured to control a number of properties of the water in the nozzle system such that the nozzle system sprays drops of the water having two ranges of sizes for a desired type of icing condition,
wherein the number of properties is selected from at least one of a water pressure, an air pressure, and a temperature.

20. The icing simulation system of claim 19, wherein the nozzle system further comprises a plurality of spray bars and each spray bar of the plurality of spray bars comprises a group of nozzles, wherein the controller is configured to individually control the spray bars such that the spray bars spray drops of the water in different size ranges and to control the temperature of the water in the nozzle system such that the water in the nozzle system does not freeze within nozzles of the nozzle system, wherein the two ranges of sizes of the drops of water comprise a supercooled large drop bimodal distribution, and wherein the desired type of icing condition includes drops of the water having a diameter in a range from about 0.112 millimeters to about 2.2 millimeters.

* * * * *